Oct. 30, 1956   J. D. BITNER ET AL   2,768,801
ROLL CONTROL MEANS FOR AN AIRCRAFT
Filed March 20, 1950   4 Sheets-Sheet 1
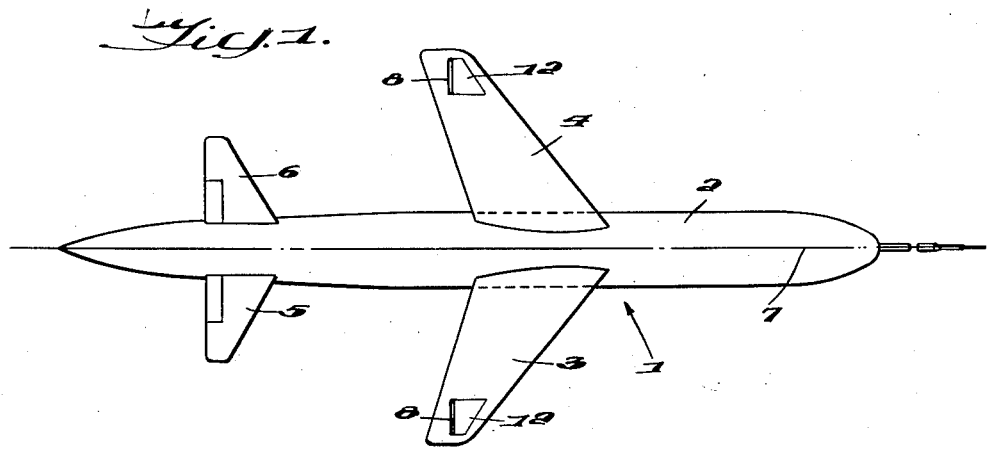
Fig. 1.
Fig. 3.
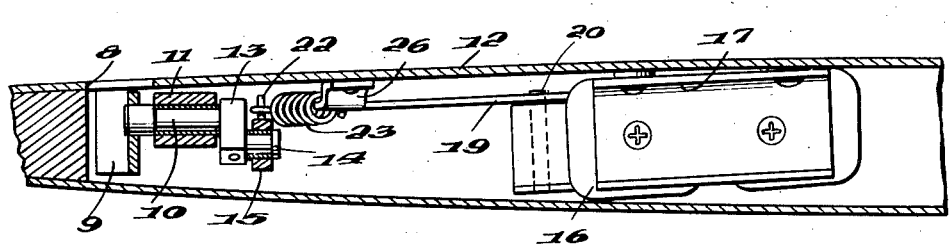
Fig. 7.
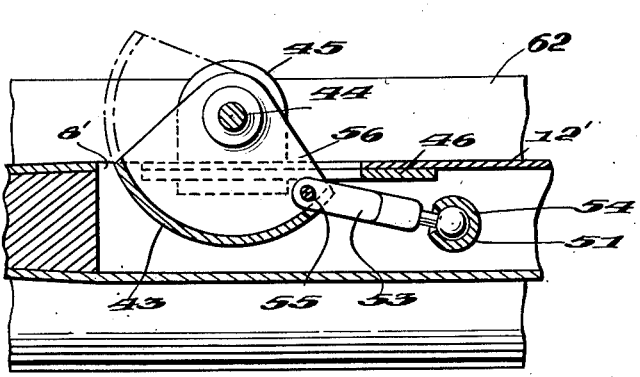
INVENTORS
JOHN D. BITNER,
HOWARD W. MERRILL,
JOHN DONALD RAUTH,
URBAN W. RICHARDSON,
BY Martin E. Hogan Jr.
ATTORNEY

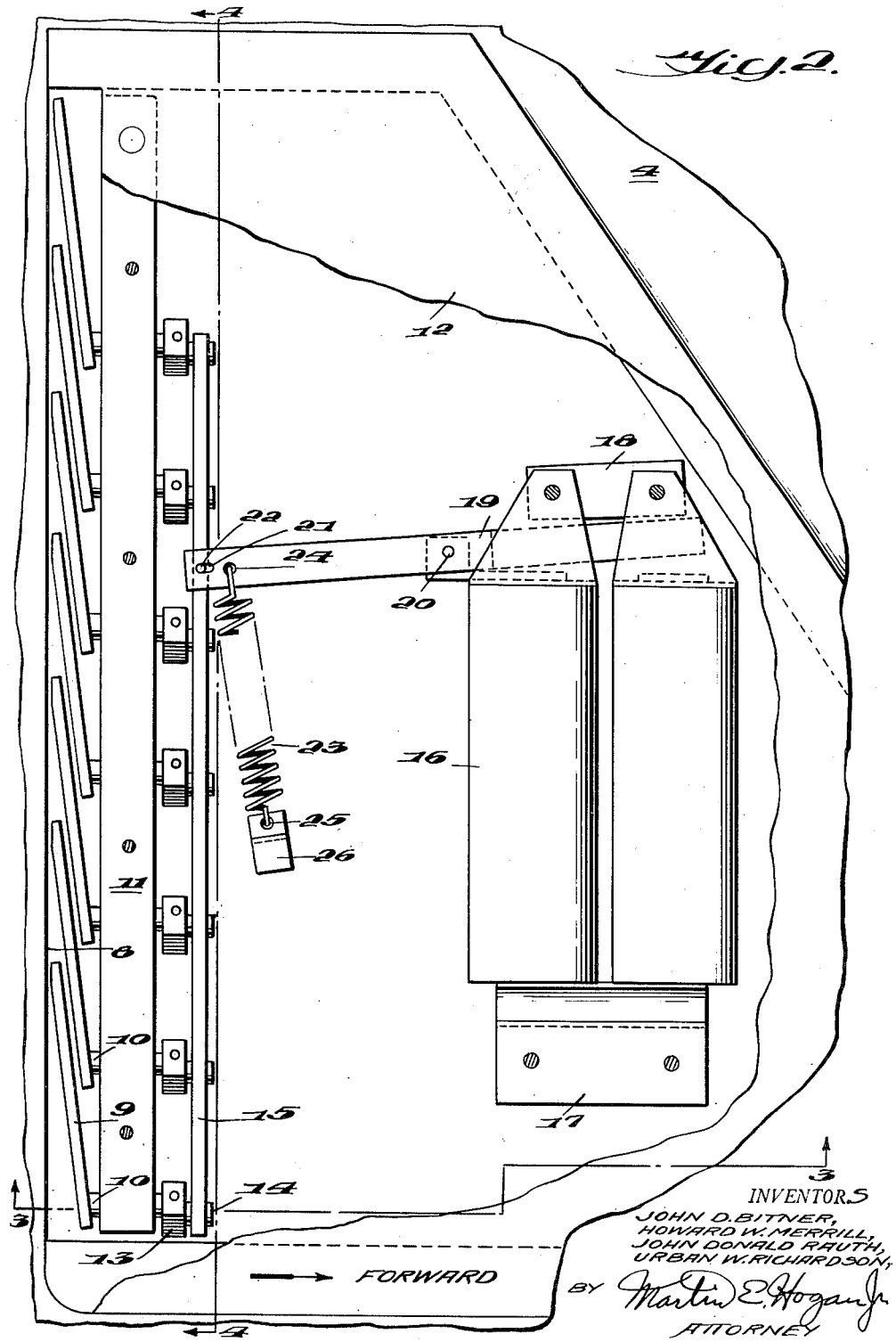

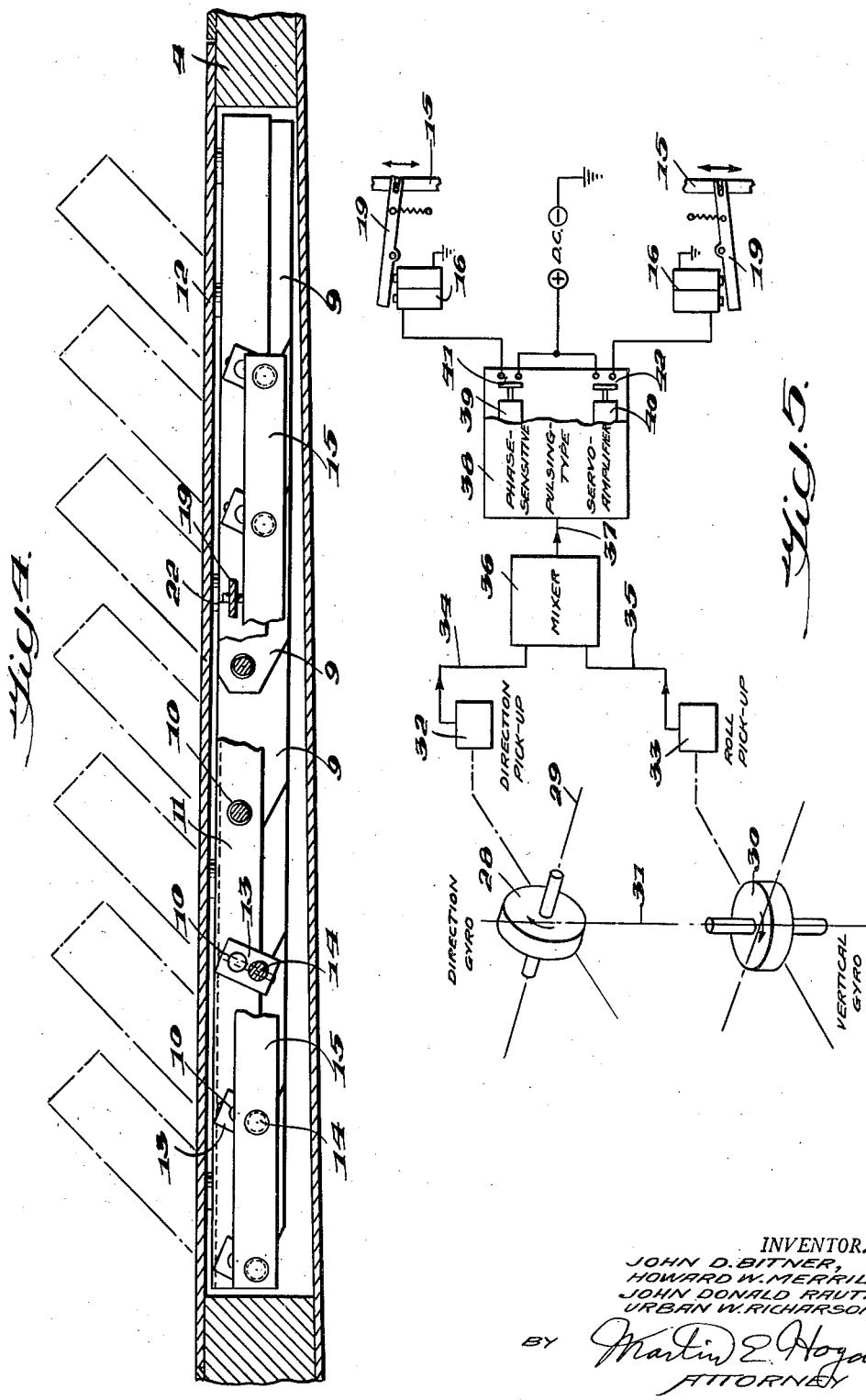

Oct. 30, 1956 J. D. BITNER ET AL 2,768,801
ROLL CONTROL MEANS FOR AN AIRCRAFT
Filed March 20, 1950 4 Sheets-Sheet 4
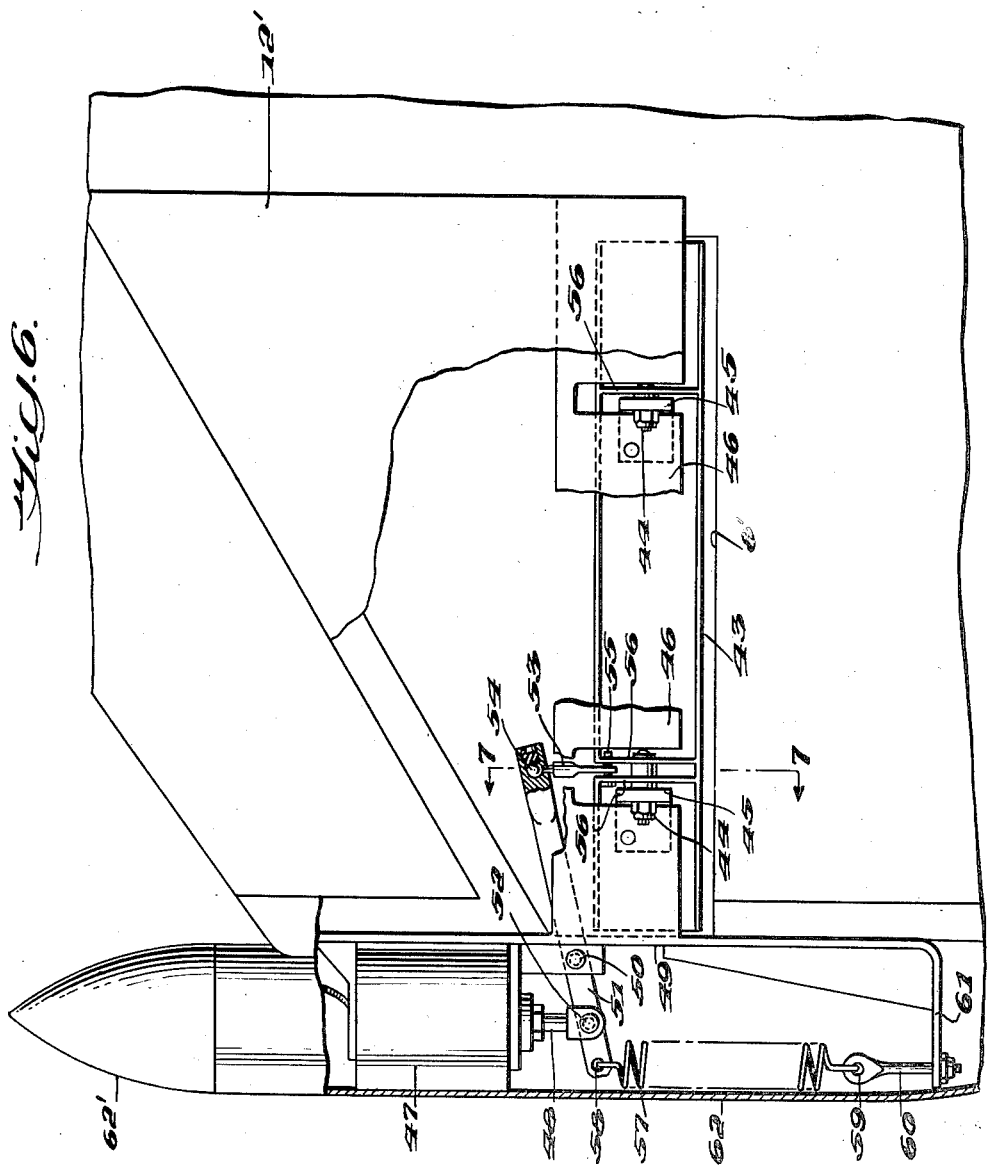
INVENTORS
JOHN D. BITNER,
HOWARD W. MERRILL,
JOHN DONALD RAUTH,
URBAN W. RICHARDSON,
BY
ATTORNEY

United States Patent Office 2,768,801
Patented Oct. 30, 1956

2,768,801
ROLL CONTROL MEANS FOR AN AIRCRAFT

John D. Bitner and Howard W. Merrill, Towson, John Donald Rauth, Middle River, and Urban W. Richardson, Baltimore, Md., assignors to The Glenn L. Martin Company, Middle River, Md., a corporation of Maryland Application March 20, 1950, Serial No. 150,648

13 Claims. (Cl. 244—90)

This invention relates to an improved roll control means for an aircraft, which control means is especially well adapted for use in conjunction with aircraft having extremely thin wing sections.

Particularly where high speed pilotless aircraft are employed, the problem of obtaining adequate lateral control assumes somewhat large proportions. In such aircraft, the wing normally is of extremely thin section, particularly adjacent the wing tips, where roll control means should be located for most effective action. As a result, there is normally insufficient room within the vertical dimensions of the wing to house a conventional spoiler of sufficient area to give effective control action or to provide for suitable actuating mechanism therefor. Similarly, if conventional ailerons are used, it is substantially impossible to provide both for adequately supporting and for actuating such an aileron by mechanism within the vertical dimensions of the wing. Even where, by careful designing of the components, it is found possible to locate the actuating mechanism within the wing, it is substantially impossible to provide for an adequate follow-up mechanism by means of which the amount of control action can be proportioned in accordance with the extent of control desired.

It is therefore an object of this invention to provide improved roll control means of the spoiler aileron type which, together with its actuating means, is adapted to be housed within the wing, and which, when operated, will provide effective rolling moments.

It is a further object of this invention to provide, in conjunction with such roll control means, a control system by means of which the extent of control action may be varied to correspond to that desired at a particular time, without requiring the conventional follow-up mechanism.

It is a further object to provide spoiler mechanism which is normally housed within the wing and which may be extended through a suitable slot in the upper surface of the wing to provide a relatively large effective control area.

A further object is to provide in conjunction with such a spoiler an actuating mechanism which includes an electro-magnetic actuator adapted, when energized, to fully extend the spoiler, together with means to quickly return the spoiler to retracted position upon deenergization of the magnetic means.

A still further object is to provide a control system for such magnetic actuating means which will cyclically energize and deenergize the actuating mechanism to extend and retract the spoiler, and wherein the relative duration of the energization pulse of each cycle will be varied in accordance with the extent of control action desired.

Further and other objects will become apparent after consideration of the following specification taken in view of the drawings and the appended claims.

In the drawing:

Figure 1 is a top plan view of an aircraft showing the location of the spoilers of this invention.

Figure 2 is a fragmentary top plan view of the one form of spoiler and its actuating mechanism.

Figure 3 is a sectional view taken on the line 3—3 of Figure 2.

Figure 4 is a sectional view taken on the line 4—4 of Figure 2, with portions broken away to better show the construction.

Figure 5 is a schematic diagram of the roll control system.

Figure 6 is a top plan view of a second form of spoiler together with its actuating mechanism, and Figure 7 is a section taken on the line 7—7 of Figure 6.

The invention is shown in Figure 1, as being applied to a high-speed aircraft of the pilotless type, having the usual fuselage 2, wings 3 and 4 and tail surfaces 5 and 6. To control the attitude of the aircraft about its longitudinal or roll axis 7, spoilers are provided adjacent the tips of the wings for projection and retraction through the slots 8 shown therein.

As can be seen in Figures 3 and 4, the wing adjacent the spoiler is extremely thin, in actual practice being only about one inch thick in this area. Figures 2, 3 and 4, show in detail one type of spoiler and its actuating mechanism, (which spoiler will hereafter be termed a finger-type spoiler) and which is especially well adapted for use in conjunction with such a thin wing. The finger spoiler comprises a plurality of generally rectangular vanes 9, each being rigidly attached to a pivot shaft 10, rotatably journalled within a common supporting bar 11, which bar is in turn suitably supported from the removable upper skin panel 12, adjacent the forward edge of the slot 8. Rigidly connected to the opposite or forward ends of the shafts 10, are cranks 13 which include crank pins 14 offset radially from the axes of shafts 10 as best shown in Figures 3 and 4. The crank pins 14 are engaged by a common actuating bar 15 arranged generally parallel to the support 11, which bar 15 is adapted to be moved generally end-wise to simultaneously swing the vanes 9 upwardly through the slot 8 as indicated by dash lines in Figure 4. It should be noted that the vanes 9 are each longer than the spacing between the pivot shafts 10 and that, while they are generally normal to the pivot axes, they are angled slightly with respect to a plane perpendicular to said shafts so that in retracted position they will nest with one another in overlapping relationship. In this way, it is possible to obtain an effective spoiler area of relatively great extent when the vanes are extended and yet have the vanes completely housed within the wing when in retracted position.

To move the actuating bar 15, the following mechanism is provided. An electro-magnet 16 is suitably supported by brackets 17 and 18 from the panel 12 and includes an armature lever 19 pivoted thereto as at 20. The free end of lever 19 is slotted as at 21 and engages a pin 22 rigid with and upstanding from the bar 15. Thus upon energization the magnet 16 will swing its armature lever 19 in a clockwise direction about pivot 20 and, through the intermediacy of the pin and slot connection will shift the bar 15 in the general direction of the wing tip to in turn conjointly swing the vanes 9 to their operative, extended position. To retract the vanes, a tension spring 23 is provided, connected to the armature 19 at 24 and having its opposite end connected at 25 to a suitable anchor bracket 26 carried by the panel 12.

In the particular aircraft shown, both lateral control and directional control are produced by appropriate use of the spoilers. As best shown in Figure 5, any deviation of the craft from the desired direction of flight is sensed by a direction gyro 28, mounted for rotation about a longitudinal axis 29, parallel to or coincident with the roll axis of the craft. Similarly angular deviations of the aircraft from a desired flight attitude about the roll axis are sensed by a vertical gyro 30, mounted to rotate about a vertical axis 31. Conventional pick-up units 32 and 33 are provided in conjunction with each of the gyros to provide an error signal which varies in accordance with the extent of the deviation sensed by the gyro. In the instant case, the pick-up units are of the conventional autosyn type, which provide a 400 cycle A. C. error voltage, the amplitude of which varies with the extent of deviation and the phase of which varies with the sense of the deviation from the desired attitude. Such pick-up units are shown in the patent to Young, No. 2,464,629. These error signals are conducted as at 34 and 35 to a conventional mixer 36 which combines the signals algebraically to produce a resultant control signal of a phase and amplitude which will correspond to the direction and extent of the control action needed to correct for the deviations. Mixer 36 may, for example, comprise merely circuitry for connecting the outputs from pick-up units 32 and 33 in series as shown in Young 2,464,629, or, if more gain is desired, may comprise a typical multigrid vacuum tube amplifier as shown at 63 in Patent No. 2,324,077. This control signal is conducted as at 37 to a conventional phase-sensitive pulsing-type servo-amplifier 38 of a type commercially available on the open market. While this servo-amplifier does not per se constitute our invention, its general characteristics will be described so as to more clearly set forth its novel cooperation with the other elements of our control system. Suffice it to say that the servo-amplifier 38 includes a pair of control relays 39 and 40 which are adapted to be selectively energized to close their control contacts 41 or 42. The circuitry of the servo-amplifier is such that one or the other of the relays will be selected for operation, depending upon the phase of the control signal applied thereto, and the selected relay will cyclically open and close its contacts at a predetermined rate, the relative length of time in each cycle during which the contacts will be closed varying in accordance with the amplitude of the control signal. Thus for example, a relatively low amplitude control signal of one phase will cause a cyclical energization of the relay 39 wherein the length of time that the contacts 41 will be closed may amount to, say, 10 percent of each pulsing cycle. If a control signal of the same phase, but of considerably greater amplitude is applied, the relay 39 will be energized to close its contacts 41 for perhaps 90 percent of each pulsing cycle. Still greater amplitude control signals will cause the relay to hold its contacts closed until such time as the control signal voltage again drops off to a lower value at which the pulsing action will be resumed. Conversely, if the control signal is of opposite phase, the other relay 40 will be cyclically energized and again the relative length of time during which the contacts 42 will be closed during each pulsing cycle will vary with the amplitude of the control signal. A detailed description of such a unit appears on pages 110 to 117 of the October 1944 issue of Electronics.

As is clearly shown in Figure 5, the contacts 41 and 42 respectively control the energization of the right and left hand spoiler actuating magnets 16. Thus, it can be seen that one or the other of the spoilers will be cyclically actuated, depending upon the direction of rolling moment required to correct the deviation in roll, or direction, or both, sensed by the gyros. Also it can be seen that the relative period of time during which the selected spoiler is in extended position, will vary in accordance with the amount of deviation sensed by the gyros. In this way, a control effect generally proportional to the amount of correction desired under any particular circumstances is obtained, without the necessity of using any follow-up mechanism, as in the conventional control system.

Figures 6 and 7 show a second type of spoiler, especially well adapted for use in a thin section airfoil, and which is also actuated by an electro-magnetic device, cyclically pulsed as was the above described finger-type spoiler. In this embodiment, an arcuate plate-type spoiler 43 is provided, pivotally carried as at 44 from a pair of pivot supports 45 rigid with a main mounting plate 46, supported beneath the upper skin of the wing just forward of the slot 8'. To swing the spoiler between retracted and extended positions, an electro-magnet in the form of a solenoid 47, having an axially movable plunger 48, is mounted by a suitable bracket 49, rigidly carried at the extreme tip of the wing as indicated in Figure 6. Pivotally carried by said bracket 49 as at 50, is an actuating lever 51, having a pin and slot connection at 52 with the outer end of the solenoid plunger 48. The opposite end of the lever 51 is connected by means of a link 53 to the spoiler 43. This latter link 53 has a universal connection at 54 with the free end of the lever 51 and its opposite end is somewhat loosely pivoted on a pivot pin 55 extending between a pair of webs 56 forming part of the spoiler 43. By this arrangement, when the solenoid 47 is energized, it will retract its plunger 48, swinging the lever 51 in a clockwise direction about its pivot 50, and, through the intermediacy of the link 53, swing the spoiler 43 to its fully extended position shown in dash lines in Figure 7. To retract the spoiler, a tension spring 57 is provided, having one end connected as at 58 to the lever 51 and its opposite end connected at 59 to an adjustable anchoring means 60 carried by an outwardly extending portion 61 at the rear end of the bracket 49. To insure the desired strength and rigidity of the parts, mounting plate 46 may be made integral with the bracket 49. As shown in Figures 6 and 7, the solenoid is of greater diameter than the thickness of the adjacent portion of the wing and to house the solenoid and the return spring, the tip portion of the wing is enlarged to form an elongated streamlined housing 62 extending longitudinally of the aircraft and terminating in a generally conical nose portion 62' protruding forwardly of the leading edge of the wing. As in the previously described embodiment, a removable skin panel 12' is provided for permitting access to the spoiler assembly.

This arcuate type of spoiler is intended to be controlled in the same manner as was the finger spoiler, previously described. This involves merely substituting the solenoids 47 for the magnets 16 in Figure 5. With such an arrangement, it can be readily seen that one or the other of the spoilers will be cyclically actuated in the same manner as were the finger spoilers so as to give an effective spoiler action proportional to the amount of correction desired under any particular circumstances.

The operation of the invention is believed to be fairly obvious from the above description. For example, assume that the aircraft has deviated to the right a few degrees from the desired direction of flight. Under these circumstances, a 400 cycle A. C. error voltage, of an amplitude corresponding to the angular extent of deviation and of a phase (which for clarity may be called phase A) corresponding to the direction of the deviation, will appear at the output of the direction gyro pick-up unit 32. If the craft is in normal horizontal flight attitude, there will, at this time, be no error signal produced by the roll pick-up unit 33. Thus the output or control signal from the mixer 36 will correspond to the error signal from the direction pick-up 32 both in amplitude and phase. The circuitry of the servo-amplifier 38 is such that whenever the control signal is of phase A, the control relay 40 of the phase sensitive pulsing-type servo-amplifier will be cyclically energized to correspondingly cyclically energize the actuating magnet 16 of the left hand spoiler assembly and cause the latter to be cyclically extended and retracted. As previously described, the relative length of time in each cycle during which the spoiler is extended will correspond to the amplitude of the control signal, which, in this case, will correspond to the extent of the deviation.

As a result of this cyclic pulsing or "pecking" action of the left hand spoiler, the craft will begin to roll so as to lower its left wing, and a slight yawing movement (due to the increased drag on the left wing), tending to swing the craft to the left, will also be produced. As the craft begins to roll, the roll pick-up 33 associated with the vertical gyro will produce a 400 cycle A. C. error signal which will be 180° out of phase with phase A (and which will hereafter be termed phase B). This phase B error signal will be conducted to the mixer 36 and, as previously described, will be algebraically combined with the direction error signal. Since these two signals, under the assumed conditions, will be of opposite phase, they will tend to cancel one another. Thus, as soon as the craft has rolled to a predetermined extent, the amplitude of the roll error signal will equal that of the direction error signal and there will be no output or control signal from the mixer 36. The relay 40 will therefore cease its pulsing action and both ailerons will remain in their retracted position. When the craft has returned to its desired direction, the direction error signal will no longer exist, the phase B roll error signal will therefore appear at the output of the mixer and the control relay 39 will be cyclically actuated to now cause the pulsing actuation of the right hand spoiler to restore the plane to its normal horizontal flight attitude. While in the above descriptions these various conditions have been described as definite steps, in actual practice there will be a continuous changing of the amplitudes of the direction and roll signals as the plane begins to move back to its desired line of flight. Since the output of the mixer depends on the algebraical sum of the amplitudes of these error signals, it too will be continuously changing either in amplitude or phase or both to produce a corrective action on the controls which is proportional to the amount and direction of control action needed at any particular time. Thus, it may be seen that the above described control system provides an effective, lightweight, and relatively fool-proof arrangement which is especially well adapted for the control of an aircraft, particularly one of the highspeed, pilotless type.

While in the described system, the error signal and control signal have been disclosed as of the electrical type, it is apparent that equivalent hydraulic and/or mechanical arrangements could be readily substituted for producing similar results, without departing from the principles of this invention. While the arrangement shown has been described as being applied to pilotless aircraft, it is obvious that the same system is equally applicable to a piloted aircraft.

Other changes and modifications will be apparent to those skilled in the art to which this invention pertains, and may be made without departing from the spirit and scope of this invention as defined by the appended claims.

We claim as our invention:

1. In a control means for an aircraft having a wing extending laterally with respect to the longitudinal axis thereof, said wing being provided with a slot in its upper surface extending generally normal to said axis, a spoiler aileron comprising a plurality of vanes normally housed within said wing beneath said slot and overlapping one another lengthwise of said slot, said vanes being pivotally mounted within said wing for limited swinging movement about individual pivot axes extending substantially normal to said slot and to said vanes, and means for conjointly swinging said vanes about their pivot axes to extend and retract said vanes through said slot.

2. In a control means for an aircraft having a wing extending laterally with respect to the longitudinal axis thereof, said wing being provided with a slot in its upper surface extending generally normal to said axis, a spoiler aileron comprising a plurality of vanes normally housed within said wing beneath said slot, said vanes being pivotally mounted within said wing for limited swinging movement about individual pivot axes extending substantially normal to said slot and to said vanes, and means for conjointly swinging said vanes about their pivot axes to extend and retract said vanes through said slot, the spacing between adjacent pivot axes being substantially less than the radial length of the vanes whereby adjacent vanes overlap when in retracted position.

3. In a control means for an aircraft having a wing extending laterally with respect to the longitudinal axis thereof, said wing being provided with a slot in its upper surface extending generally normal to said axis, a spoiler aileron comprising a plurality of vanes normally housed within said wing beneath said slot, said vanes being pivotally mounted within said wing for limited swinging movement about individual pivot axes extending substantially normal to said slot and to said vanes, and means for conjointly swinging said vanes about their pivot axes to extend and retract said vanes through said slot, said vanes having a width slightly less than the thickness of the wing in the vicinity of said slot and of a length substantially greater than said wing thickness, and said pivot axes being spaced along said slot less than said length and more than said width whereby when extended through said slot said vanes collectively will present a relatively large effective spoiler area above said upper wing surface facing generally normal to the longitudinal axis of said aircraft.

4. In a control means for an aircraft having a wing extending laterally with respect to the longitudinal axis thereof, said wing being provided with a slot in its upper surface extending generally normal to said axis, a spoiler aileron comprising a plurality of vanes normally housed within said wing beneath said slot, said vanes being pivotally mounted within said wing for limited swinging movement about individual pivot axes extending substantially normal to said slot and to said vanes, the length of each vane being substantially greater than the spacing of said pivot axes below said upper wing surface and greater than the spacing between adjacent pivots whereby said vanes may be swung about their axes to a position wherein they extend outwardly through said slot to collectively present a relatively large effective spoiler area above said wing surface facing generally normal to the longitudinal axis of said aircraft, and means for conjointly swinging said vanes about their pivot axes between extended and retracted positions.

5. Control means for an aircraft having laterally extending wings, comprising direction sensing means providing an error signal voltage of a phase and amplitude corresponding respectively to the direction of angular deviation from a predetermined direction of flight and to the relative extent of such deviation, roll attitude sensing means also providing a similar error signal voltage of a phase and amplitude corresponding to the direction and to the extent of lateral roll deviation from a predetermined flight attitude, mixer means connected to both said sensing means for combining said error signal voltages and producing at its output a resultant control voltage the phase and amplitude of which depends on the relative phase and amplitudes of the error signal voltages, a phase-sensitive, pulsing-type servo-amplifier connected to the output of said mixer means and including a pair of control relays, said servo-amplifier being of the type wherein one or the other of said relays, depending upon the phase of said control voltage, is cyclically energized and deenergized and wherein the relative duration of the energization pulse of each cycle varies in accordance with the amplitude of said control voltage, an aileron movably carried by each wing and movable between operative and inoperative positions, a pair of electro-magnetic means, one connected to each aileron and effective when energized to move the associated aileron to full operative position, and means effective upon deenergization of said electro-magnetic means to return said aileron to inoperative position, one of said electro-magnetic means being connected to each of said control relays for control thereby, whereby the ailerons will be correspondingly selectively and cyclically actuated to vary the effective control action in accordance with the deviations of said aircraft from its desired flight attitude.

6. In a control means for an aircraft having a wing extending laterally with respect to the longitudinal axis thereof, said wing being provided with a slot in its upper surface extending generally normal to said axis, a spoiler aileron comprising a plurality of vanes normally housed within said wing beneath said slot and overlapping one another lengthwise of said slot, said vanes being pivotally mounted within said wing for limited swinging movement about individual pivot axes extending substantially normal to said slot and to said vanes, actuating means including an electro-magnet connected to said vanes and operative upon energization of said magnet to conjointly swing said vanes through said slot to fully extended position, and biasing means for retracting said vanes upon deenergization of said electro-magnet.

7. In a control means for an aircraft having a wing extending laterally with respect to the longitudinal axis thereof, said wing being provided with a slot in its upper surface extending generally normal to said axis, a spoiler aileron comprising a plurality of vanes normally housed within said wing beneath said slot, said vanes being pivotally mounted within said wing for limited swinging movement about individual pivot axes extending substantially normal to said slot and to said vanes, actuating means including an electro-magnet to conjointly swing said vanes through said slot to fully extended position, biasing means for retracting said vanes upon deenergization of said electro-magnet, and means including pulse generating means connected to said electro-magnet and responsive to a deviation of said aircraft from a predetermined attitude for cyclically generating a series of spaced electrical pulses for energizing and deenergizing said electro-magnet, the relative duration of the energization pulse in each cycle varying in accordance with the magnitude of said deviation whereby the percentage of time during which the vanes are in extended position will likewise vary with the magnitude of said deviation.

8. In a control means for an aircraft having a wing extending laterally with respect to the longitudinal axis thereof, said wing being provided with a slot in its upper surface extending generally normal to said axis, a spoiler aileron comprising a plurality of vanes normally housed within said wing beneath said slot, said vanes being pivotally mounted within said wing for limited swinging movement about individual pivot axes extending substantially normal to said slot and to said vanes, actuating means including an electro-magnet connected to said vanes and operative upon energization of said magnet to conjointly swing said vanes through said slot to fully extended position, biasing means for retracting said vanes upon deenergization of said electro-magnet, means for producing a control signal the magnitude of which varies in accordance with the amount of roll correction desired, and pulse generating means connected to said electro-magnet and responsive to said control signal for cyclically generating a series of spaced energization pulses for energizing and deenergizing said electro-magnet, the relative duration of the energization pulse in each cycle varying in accordance with the magnitude of said control signal whereby the percentage of time during which the vanes are in extended position will likewise vary with the amount of roll correction desired.

9. In a lateral control system for an aircraft, an aileron movably carried by said aircraft and movable between operative and inoperative positions, actuating means effective when energized to move said aileron to its fully operative position, means effective upon deenergization of said actuating means to return said aileron to inoperative position, means for producing a control signal, the magnitude of which varies in accordance with the amount of roll correction desired, and impulse producing means connected to said actuating means and responsive to said control signal for cyclically producing a series of spaced impulses for energizing and deenergizing said actuating means at a predetermined rate.

10. In a lateral control system for an aircraft, an aileron movably carried by said aircraft and movable between operative and inoperative positions, actuating means effective when energized to move said aileron to its fully operative position, means effective upon deenergization of said actuating means to return said aileron to inoperative position, means for producing a control signal, the magnitude of which varies in accordance with the amount of roll correction desired, and pulse producing means connected to said actuating means and responsive to said control signal for cyclically producing a series of spaced impulses for energizing and deenergizing said actuating means at a predetermined rate, the relative duration of the energization pulse in each cycle varying in accordance with the magnitude of said control signal whereby the effective aileron action will likewise vary with the amount of roll correction desired.

11. In a control system for an aircraft having a relatively thin wing; a spoiler aileron carried by said wing and movable between an inoperative retracted position, wherein said aileron is substantially housed within said wing, and an extended operative position, wherein it projects outwardly beyond the upper surface of said wing; actuating means for said aileron including an electromagnet, operative when energized to move said aileron to its fully operative position; spring means effective upon deenergization of said magnet to return said aileron to its retracted position; means for producing a control signal, the magnitude of which varies in accordance with the amount of roll correction desired; and electrical pulse generating means connected to said electro-magnet and responsive to said control signal for cyclically generating a series of spaced pulses for energizing and deenergizing said electro-magnet at a predetermined rate.

12. In a control system for an aircraft having a relatively thin wing; a spoiler aileron carried by said wing and movable between an inoperative retracted position, wherein said aileron is substantially housed within said wing, and an extended operative position, wherein it projects outwardly beyond the upper surface of said wing; actuating means for said aileron including an electro-magnet, operative when energized to move said aileron to its fully operative position; spring means effective upon deenergization of said magnet to return said aileron to its retracted position; means for producing a control signal, the magnitude of which varies in accordance with the amount of roll correction desired; and electrical pulse generating means connected to said magnet and responsive to said control signal for cyclically generating a series of spaced pulses for energizing and deenergizing said electro-magnet at a predetermined rate, the relative duration of the energization pulse in each cycle varying in accordance with the magnitude of said control signal whereby the effective aileron action will likewise vary with the amount of roll correction desired.

13. In a control system for an aircraft having a relatively thin, high speed wing, a spoiler aileron movably carried by said wing adjacent the tip portion thereof and movable between operative and inoperative positions to control the roll attitude of said aircraft, and means including an electro-magnetic actuator carried by and housed within said wing adjacent said aileron for cyclically moving said aileron between said operative and inoperative positions, the vertical dimensions of said actuator being greater than the normal thickness of said wing adjacent said tip portion and said wing having its tip portion formed to provide an enlarged, elongated streamlined housing for said actuator extending substantially longitudinally of said aircraft.

References Cited in the file of this patent

UNITED STATES PATENTS

| | | |
|---|---|---|
| 1,047,827 | Monroe | Dec. 17, 1912 |
| 1,466,551 | Thurston | Aug. 28, 1923 |
| 1,821,273 | Pike | Sept. 1, 1931 |
| 1,858,259 | Alfaro | May 17, 1932 |
| 2,431,449 | Ashkenas et al. | Nov. 25, 1947 |
| 2,450,084 | Emerson | Sept. 28, 1948 |
| 2,556,345 | Sivitz et al. | June 12, 1951 |

FOREIGN PATENTS

| | | |
|---|---|---|
| 14,353 | Netherlands | Feb. 15, 1926 |
| 507,103 | Great Britain | June 9, 1939 |
| 615,195 | Great Britain | Jan. 3, 1949 |
| 883,096 | France | Mar. 15, 1943 |

OTHER REFERENCES

Electronics, October 1944, pp. 110 to 117.